(12) United States Patent
Krishna et al.

(10) Patent No.: US 10,896,205 B2
(45) Date of Patent: Jan. 19, 2021

(54) INTERACTIVE ON-DEMAND HYPERCUBE SYNTHESIS BASED MULTI-DIMENSIONAL DRILLDOWN AND A PIVOTAL ANALYSIS TOOL AND METHODS OF USE

(71) Applicant: Pelatro Pte. Ltd., Singapore (SG)

(72) Inventors: Arun K. Krishna, Bangalore (IN); Pramod K. Prabhakar, Bangalore (IN)

(73) Assignee: PELATRO PTE. LTD., Singapore (SG)

( * ) Notice: Subject to any disclaimer, the term of this patent is extended or adjusted under 35 U.S.C. 154(b) by 113 days.

(21) Appl. No.: 16/399,678

(22) Filed: Apr. 30, 2019

(65) Prior Publication Data

US 2019/0332610 A1     Oct. 31, 2019

Related U.S. Application Data

(60) Provisional application No. 62/664,775, filed on Apr. 30, 2018.

(51) Int. Cl.

| | |
|---|---|
| *G06F 3/048* | (2013.01) |
| *G06F 16/28* | (2019.01) |
| *G06F 16/22* | (2019.01) |
| *G06F 16/248* | (2019.01) |
| *G06F 16/25* | (2019.01) |
| *G06F 16/2457* | (2019.01) |
| *G06F 3/0482* | (2013.01) |

(52) U.S. Cl.
CPC ........ *G06F 16/283* (2019.01); *G06F 16/2264* (2019.01); *G06F 16/248* (2019.01); *G06F 16/2457* (2019.01); *G06F 16/25* (2019.01); *G06F 3/0482* (2013.01)

(58) Field of Classification Search
CPC .. G06F 16/22; G06F 16/2264; G06F 16/2457; G06F 16/248; G06F 16/25; G06F 16/28; G06F 16/283; G06F 3/00; G06F 3/048; G06F 3/04815
See application file for complete search history.

(56) References Cited

U.S. PATENT DOCUMENTS

| | | | |
|---|---|---|---|
| 5,751,289 A | 5/1998 | Myers | |
| 5,940,818 A | 8/1999 | Malloy et al. | |
| 7,146,375 B2 * | 12/2006 | Egilsson | ............. G06F 21/6245 707/605 |

(Continued)

OTHER PUBLICATIONS

B. S. Meiguins, et al. "Using Augmented Reality for Multidimensional Data Visualization," Tenth International Conference on Information Visualisation (IV'06), London, England, 2006, pp. 529-534.

*Primary Examiner* — Xiomara L Bautista
(74) *Attorney, Agent, or Firm* — Richard C. Piercy; Mathew L. Grell; Grell & Watson Patent Attorneys LLC

(57) ABSTRACT

A method for facilitating the improvement and simplification of on the fly drilldown across any subset of dimensions for very large volumes of data in real time by utilizing interactive on-demand hypercube synthesis based multi-dimensional drilldown and a pivotal analysis tool. A computer system to improve, simplify, and facilitate on the fly drilldown across any subset of dimensions for very large volumes of data in real time via interactive on-demand hypercube synthesis based multi-dimensional drilldown and a pivotal analysis tool.

20 Claims, 12 Drawing Sheets

(56) References Cited

U.S. PATENT DOCUMENTS

| | | | | |
|---|---|---|---|---|
| 8,122,337 | B2* | 2/2012 | MacGregor | G06F 16/283 |
| | | | | 715/214 |
| 9,465,891 | B1* | 10/2016 | Kagan | G06F 3/04815 |
| 2006/0031187 | A1* | 2/2006 | Pyrce | G06F 16/283 |
| 2009/0064051 | A1* | 3/2009 | Furht | H04N 21/4782 |
| | | | | 715/848 |
| 2012/0112997 | A1* | 5/2012 | Becerra, Sr. | G06F 40/18 |
| | | | | 345/156 |
| 2015/0370883 | A1* | 12/2015 | Kalki | G06F 21/6236 |
| | | | | 707/600 |
| 2016/0180057 | A1* | 6/2016 | Bossio | G16H 20/10 |
| | | | | 705/2 |

* cited by examiner

INTERACTIVE ON-DEMAND HYPERCUBE SYNTHESIS BASED MULTI-DIMENSIONAL DRILLDOWN AND A PIVOTAL ANALYSIS TOOL AND METHODS OF USE

CROSS-REFERENCE TO RELATED APPLICATIONS

To the full extent permitted by law, the present United States Non-provisional Patent Application hereby claims priority to and the full benefit of, United States Provisional Application entitled "On-demand hypercube synthesis based multi-dimensional drilldown and a pivotal analysis tool system and methods of use," having assigned Ser. No. 62/664,775, filed on Apr. 30 2018, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to electric digital data processing, namely architectures of general-purpose stored program computers. More particularly, the instant disclosure relates to three-dimensional arrays or hypercubes which may be used to provide a multi-dimensional pivotal analysis tool with dynamic drilldown support through synthesis of incrementally smaller hypercubes on the fly to allow for greater feasibility and increased resolution when compared to utilization of pre-created large hypercubes.

Description of the Related Art

Most large businesses have a large volume of customers or subscribers. To accommodate the large volume of data associated with transactions related to their customers or subscribers, they may use one or more data stores sufficient to store a large volume of data concerning their customers or subscribers, their customers' or subscribers' activity or purchases, and other relevant data about their customers or subscribers. Day to day interactions and transactions may be recorded or collected, stored, processed, managed, or used to generate insights about the customers or subscribers. These data stores may often be repositories of information and data by which business and marketing operations may base their actions upon. For instance, an accounts receivable department may access a list of subscribers, each subscriber's invoice date, each subscriber's subscription rate, and each subscriber's method of payment on file in order to manually or automatically invoice all subscribers during a typical billing cycle. In another instance, a marketing department may access a list of subscribers and the length each subscriber has been a customer of the business in order to reward certain customers for their length of patronage. In yet another instance, if a customer acquisition and retention department would want to determine whether the department's customer acquisition and retention initiatives have been effective, it may query the data store(s) for the number of new customers over a period of time, the number of cancelled accounts over a period of time, and possibly the number of overall customers to calculate the overall churn rate of their subscriber base over a period of time.

In general, such data may be stored and even analyzed using an Enterprise Resource Planning (ERP) system or platform. Over the years, ERP systems and platforms have evolved to either include or interface with various business platforms such as Customer Relationship Managers (CRMs), subscriber usage monitors, accounting software, distribution platforms, and business intelligence solutions. The data store and corresponding ERP system or platform may function as a transactional system, as online transaction processing databases, as an operational database management system, as a distributed database system offering similar functionality, and/or a combination of the like, whereby the transaction itself may be performed utilizing the ERP system or platform and the resulting data need not be stored on, recorded on, or otherwise copied to or from a separate a centralized data store. The data store and corresponding ERP system or platform may often but not always be stored in a relational database or table on a server connected to a network.

When implemented in such a way, the central data store or distributed data stores from which the ERP system or platform operates may not function well to also easily analyze the data it stores or doing so may hinder the ability to process transactions for which it may be intended if simultaneously providing analysis on live real-time data. To address this concern, organizations may segregate their transactional processing from their analyzation processing by literally copying some or all of the data in their centralized data store used for transacting business onto a data store used for dedicated analyzation of the data, thus relieving any strain analyzing data may place on completing transactions. These separate data stores used for analysis and sometimes reporting purposes are commonly called a data warehouse and may be updated manually or automatically according to a set schedule (e.g. hourly, daily, monthly, annually, etc.) or upon specific milestones or events. These data warehouses may provide a summary snapshot by which further analysis of the information may be completed, depending on the insight necessary for a given business unit, or may be referenced to produce common or specific reports for said business units. Depending on the size of the business and the relative size of its data store, in order to increase functionality, lower processing time, and decrease or more efficiently distribute storage consumption, a business may separate data among a variety of data warehouses based on how the data is intended to be used. By way of example, an accounts receivable department would likely not need the same data as an accounts payable department and may therefore have separate data warehouses. Similarly, international companies may choose to separate their data warehouse along state, regional, national, or continental boundaries or even maintain a plurality of data warehouses for state, regional, national and continental geographic areas. This type of data separation may have additional benefits such as the implied security of a department or business territory only having access to the data which it needs to function. Other benefits may include the ability to more accurately characterize or summarize data according to time, product, service, customer, location, etc.

These smaller or separate data warehouses are often referred to as data marts, and may function by copying directly from the transactional data store the relevant data or by copying a subset of a data set stored on a centralized data warehouse. A data mart may be functionally and structurally indistinguishable from a data warehouse, except that a data mart exists in relation to a larger data set as a subset of that data along one or more specified characteristics. As described above, while they possess the advantage over their corresponding data warehouse in that they are more nimble and therefore faster and easier to access, query, process data from, and create, there are instances where cross-business analysis, processing or reporting may not be possible or practical, due to the segregation across data marts. Such cross-business analysis, processing, and reporting may be best left to systems with access and means to query a more comprehensive data warehouse, and therefore may have to suffer from the disadvantages slower processing time one skilled in the art would expect when dealing with high-volume relational databases or tables. Consequently, when dealing with queries, analysis, processing and reporting for questions relied upon for business intelligence, complex formulas may be necessary to be performed upon the larger data warehouse, which may require sophisticated business and computer programming skills, in addition the increased processing capabilities of the equipment used to analyze, process, and report from the data warehouse.

One additional method to balance the need for high-volume data stores with the desire to simplify the methods of querying the data store for information and lowering the processing power required to analyze, process, and report from the data store is to employ a different system and method of data storage to represent the data in a data warehouse in the form of the business terms, rather than the underlying database format. This method is commonly referred to as an on-line analytical processing (OLAP) system. In an OLAP system, or a pre-summarized OLAP cube system, each dimension is represented in the on-line system's data structure, often in what is referred to as a cube, along with the elements of that dimension. Additionally, each dimension may further comprise a series of classifications, hierarchical levels, or hierarchies. For example, a geographical dimension might be continent, nation, state, city, and zip and a time dimension might be years, months, weeks, days, hours, minutes, and seconds. By using the OLAP system of data storage, all dimensions within a category become metadata, and can be much more easily referenced for business users who may not be as technically skilled or savvy.

There are many benefits to deploying OLAP systems instead of or alongside other methods of data storage and retrieval, at least as it relates to use by business sectors of an organization. Non-technical users may, through use of software specialized to perform certain analyses, processes, and reporting, may rapidly and effectively create ad-hoc or on-demand analyses and/or complex reports from a number of different views or perspectives, which would be either impractical or take too long using transactional systems to perform similar tasks. Importantly, deploying OLAP systems can prevent non-technical and even technical users from inadvertently creating a query which is too complex such that it takes an inordinate amount of system resources or time to complete, thereby either timing-out the operation, decreasing the performance of the entire system while the operation completes, requiring the abortion of the operation or requiring a restart of the system.

Typically, data warehouses, data marts, and even OLAP systems use relational databases and therefore most often are queried using Structured Query Language (SQL). SQL may be used to both define the tables and fields of a database and to create, delete or modify the data, along with merely querying the data stored on the database. Along with SQL, procedures may be stored on some databases allowing commonly used queries to be encoded into predefined SQL programs saved on the database to be run in a predetermined fashion, timing, or order. The complexity of creating SQL queries or even using predefined programs requires one to be competent and skilled in this area, and creating SQL queries and predefined programs that are useful to business executives requires knowledge of said business. So while one may be perfectly competent in one area, they may not be in the other, and collaboration among employees and departments may be necessary to effectuate business relevant queries.

One limitation that may often exhibited when using OLAP systems, especially when the underlying data set is especially voluminous, is that they take significant resources to build. This may mean that the construction of an OLAP system must be scheduled far enough in advance so that is ready to query at a later time or that the system constructing the OLAP system must be powerful and sophisticated enough to build the OLAP system quickly enough to satisfy the relevant business. This limitation may further be exacerbated if a business desires regularly updated information in order to make the business decisions related to the data stored on the database. If an OLAP system is already constructed based on data at a given point in time, and that data is updated based on new transactions on the database, the OLAP system may either need to be reconstructed or updated according to the new data in order to reflect the current database more accurately. Therefore, businesses may choose to update or reconstruct their OLAP system periodically or utilize sophisticated systems overnight, when they may not be in use by other segments of the business. So while a business may desire to have real-time, or at least incredibly recent data on their OLAP system when running business relevant queries, it may only have access to data pulled to construct the OLAP system during the previous periodic construction.

Another limitation that OLAP systems may suffer when deployed on large data sets is that these large volumes of data must be stored on a computer readable medium. Such media may comprise Random Access Memory (RAM), hard disk drives (HDD), or Solid-State Drives (SSD). Each storage method has its own advantages and drawbacks, but simply put, greater performance requires greater expenditures, RAM being generally the most expensive but best performance for quick access and processing of OLAP systems and queries. This is true both from an expenditure perspective and ongoing operational perspective. So while a business may wish to deploy its OLAP system on RAM to improve speed of construction and updating and to better effectuate its performance during querying, the costs associated with such a deployment may be cost prohibitive, requiring it to run on HDDs or SSDs.

Some ways information technology professionals have developed to compensate for these limitations is to segregate OLAP systems to distinct business units, build smaller OLAP cubes which do not require as many dimensions as building larger all-encompassing OLAP systems would require, or building successive OLAP systems which users may navigate among to accomplish similar goals. Each of these strategies has their own tradeoff, namely, defeating some of the purposes of deploying an all-encompassing OLAP system in the first place, rather than deploying a data mart.

The instant disclosure is designed to address at least some aspects of the problems discussed above. The hypercube system and method described herein may be designed to replace or work alongside these common database structures, or may even simply have access to these databases to construct the hypercube system using the hypercube method. Using on the fly drilldown across any subset of dimension for very large volumes of data in real time using dynamic programming and a pivotal analysis tool may help overcome many of the limitations of the systems and methods described above.

SUMMARY

Briefly described, in a possibly preferred embodiment, the present disclosure overcomes the above-mentioned disadvantages and meets the recognized need for such a device by utilizing on the fly incremental view building to visualize large volumes of data from a perspective controlled by the user. Current views may be based on a current location of the user in the hypercube, and a user may travel through the hypercube among multiple dimensions without predetermination of those dimensions prior to travel. This may be accomplished, rather than predetermining or pre-creating a large hypercube, by building and utilizing a multi-dimensional pivotal analysis tool with dynamic drilldown support and synthesizing incrementally smaller hypercubes on the fly. Put simply, by first generating a hypercube with few dimensions and building successively smaller hypercubes as a user adds categorical dimensions for analysis, a user interface can mimic the benefits of a hypercube system having many more dimensions. This can be accomplished over a much shorter period than generating an OLAP cube system would normally take, thereby giving the user access to more updated information. By first generating a hypercube across all or a subset of customers or subscribers in limited pre-determined dimensions, then building successive smaller hypercubes in further dimensions or drilldowns, a user may quickly travel across views and perspectives without the need to generate a large hypercube, which may be impossible given the size of their data set, number of columns or dimensions required, or the constraints of their system, thereby giving access to OLAP functionality to smaller businesses or organizations within businesses. Furthermore, by utilizing this disclosed system and method for facilitating interactive on-demand hypercube synthesis based multi-dimensional drilldown and a pivotal analysis tool, high-performance systems may not be necessary, allowing the system and method to be deployed in a greater variety of places, such as on a network connected to the transactional database, on a cloud-based system with access to the database, on a custom software running on an employee's business-issued laptop, desktop, or mobile device and/ or some combination of the like.

In one aspect, the hypercube synthesis may take place on fast and efficient memory or RAM by sequentially scanning compactly encoded, banded customer or subscriber profile data. Then the resulting hypercube may be constructed into a flattened hypercube modeled as a single dimensional array. Dynamic "walks" along the single dimensional array may then be performed and a user may then further define the next chosen dimension or dimensions to construct further hypercubes to be built and again flattened. Should a user choose to "step back" or "retreat" and again proceed along the originally synthesized hypercube, it may do so without suffering any lag or having to wait to rebuild the original hypercube. It may then proceed again along the flattened hypercube to discover other dimensions for analysis and construct further hypercubes. Alternatively, it may continue drilling down, choosing further dimensions for analysis, each time creating another successively smaller hypercube. Because generating small hypercubes across either all or a subset of subscribers consumes significantly fewer resources from a computing standpoint than generating a large OLAP hypercube across all or even a subset of subscribers would, the user may generate the hypercubes on-demand from much more recent data and may experience equivalent or even improved response time when assembling or generating business intelligent reports.

In another aspect, a system and method of the disclosed system may possess a specialized cube synthesizer used to construct a flattened hypercube modeled as a single dimensional array with indices ranging from 0-W, where W may denote the product of cardinality of each of the dimension of the cube under synthesis, and as such may represent a single subscriber or single type of subscriber in regard to transactional behavior. In such a variation of the disclosed system and method, subscriber profile data may be banded and stored in a compact encoded single dimensional byte array in a continuous manner where individual bands are encoded using a pre-computed number of bits and wherein the sorting mechanism may be a unique subscriber identifier for each subscriber. Then, a specialized drilldown input as chosen by a user may take place where a subset of subscribers and dimensions for the first cube may be rendered along potential insights to be used for the first view or perspective of the data being used for observation, reporting, or analysis. At this point, a single pass sorted-merge scan of the subscriber profile store may be used to filter in subscribers of interest or filter out subscribers not of interest while simultaneously contributing partial sums for the position vector for the individual categories or fields. This initial state, which may be used as a starting point for data observation, analysis, and reporting, may then be formatted and laid to the dimension-n * 8D-where "D" denotes the maximum drilldown depth and "n" denotes the subscribers qualifying for pivotal analysis.

One benefit of the disclosed system and method may be reducing the need to dedicate specialized computing resources and time to building OLAP cubes. By instead building successive hypercube arrays on-demand, an enterprise implementing the disclosed system and method may enable more of its associates to analyze and report on real-time data, creating on-demand customized reporting and analyzation procedures for individual business units. Since the enterprise would not be required to dedicate significant computing resources to building comprehensive OLAP cubes, it can do so on demand for specific business interests and insights.

Another benefit of the disclosed system and method may be that when transactional subscriber data is built into a comprehensive OLAP cube, most areas of the OLAP cube structure go unvisited. This means that computing power may be wasted on building structures, large portions of which may seldom or never be used for analysis or for developing and producing reports. While in one instance of building an OLAP cube, these unvisited areas may consume a corresponding negligible amount of computing resources, enterprises which build OLAP cubes on a regular basis may realize a tangible benefit in terms of overall power consumption, machine wear, and other benefits one skilled in the art would realize when computing power is more efficiently consumed.

A related benefit of the disclosed system and method may be that no computing resources need to be dedicated to assembling an OLAP cube for areas that are not visited in a given period. For instance, if a comprehensive OLAP system were deployed in an enterprise and scheduled to reassemble and/or update the corresponding OLAP cube on a weekly schedule, it may reassemble and/or update the cube for areas that only require quarterly reporting. This means that the system would require computing resources to build or update OLAP cube structures ten or more times than it is actually needed for reporting purposes. Other examples could include daily builds or updates that only need to be analyzed annually. Using the disclosed system and method, any of this type of data that does not require reporting or analysis during any given session would never justify even accessing the corresponding data, let alone pre-summarizing the data by building a complex multi-dimensional cube structure based upon the data.

Yet another benefit of the disclosed system and method may be empowering smaller enterprises with the data reporting and analysis capabilities of larger enterprises. Since the system and method of first generating a hypercube across all or a subset of customers or subscribers in limited pre-determined dimensions, then building successive smaller hypercubes in further dimensions or drilldowns, may require less computing power and sophistication, organizations which would otherwise not be able to justify the expenditure for or simply cannot afford the more powerful and sophisticated computing systems may be able to accomplish similar or identical results using much less powerful and sophisticated computing systems.

In select embodiments of the disclosed system and method, the end user interface of the implementation of the disclosed system and method may mimic the functionality of deploying a universal OLAP system without requiring anywhere near the resources that would be required to deploy a universal OLAP system. Since the initial assembly of the high-level hypercube may take very little time, and each successively smaller hypercube used for drilling down into the data may take very little time, the appearance to the end user may closely resemble or even be indistinguishable from the implementation of analyzing and reporting on data from an OLAP cube system.

In an optional embodiment of the disclosed system and method, the time required to assemble the first hypercube, from the perspective of an end user, may be nearly instantaneous, at least in comparison to traditional OLAP systems. Since limited resources are required to build the first hypercube, these may be assembled on a near continuous basis then cached and therefore be ready and available to access at any time without the need to request this process be initiated. Obviously, the more continuously this process is run, the more computing resources would be required to implement this system. In this embodiment, one skilled in the art could determine a sufficient compromise, based on the computing resources at their disposal and the needs of each business unit to access the most updated data. So for instance, an enterprise which may have updated its OLAP system overnight on a daily basis, may now be able to update its first-level hypercube for each business unit on a more frequent basis, thereby even further decreasing the time it would need to access the first level of data while still making available more up-to-date information to the end user. Related to this optional embodiment, successive hypercubes and drilldowns may be similarly pre-assembled on a near continuous basis and cached, thereby making the corresponding data in successive hypercubes and drilldowns available to the user on an even faster basis. Also related to this optional embodiment, successive hypercubes and drilldowns which are pre-assembled nearly continuously and cached may be the subject of reporting, analysis, or alerts for the user, thereby not requiring any human interaction to make available these historic data or snapshots at a later date.

In select applications of the disclosed system and method, enterprises may realize concrete benefits to its capability of marketing more relevant information to its existing subscribers. Enterprises with very large subscription bases which offer a large variety of transaction types and subscription levels may require exponentially larger OLAP cube structures to properly analyze its subscribers' activities. When new services, transaction types or new subscription levels begin being offered to its clients, only a subset of its subscriber base may be likely to desire these new services. One way to determine who may be likely to desire a new service may be to identify those subscribers who currently subscribe to similar services. Another way to determine who may be likely to desire a new service may be to identify subscribers who may have previously subscribed to a similar service, but no longer do. By using the disclosed system and method of first generating a hypercube across all or a subset of customers or subscribers in limited pre-determined dimensions, then building successive smaller hypercubes in further dimensions or drilldowns, a user may quickly travel across views and perspectives via a pivotal analysis tool without the need to generate a large hypercube, which may be impossible given the size of their data set or the constraints of their system. Therefore, a marketing department which desires to increase its subscriber base for a new offering may generate a hypercube across all of its subscribers, first selecting a limited number of dimensions for analysis that are relevant to the new service. Then it could build successive smaller hypercubes in further dimensions or drilldowns to clearly identify any relevant subscribers. Each time it has determined a population likely to desire the new service, it could export that population of subscribers to a tool used to directly market to its existing subscribers, thereby ensuring only relevant engagement with its user base and not endangering its credibility by offering irrelevant information about its services to those subscribers, which would unlikely or never desire the service.

In an implementation of one embodiment of the disclosed system and method, using a test data environment containing 100 million subscribers, 20 pivotable dimensions, and 5 insightable fields, performance was measured on a computing system. The initial subscriber store transformation into a flattened hypercube array generated within approximately 40 seconds. Each successively smaller hypercube generated during drilldown within less than 5 seconds each and the overall memory footprint remained between 8 and 8.5 GB. Systems and methods of using OLAP cubes to pre-summarize comparatively large subscriber bases may take ten times or longer to complete and require much larger RAM allocations.

These and other features of the interactive on-demand hypercube synthesis based multi-dimensional drilldown and a pivotal analysis tool will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
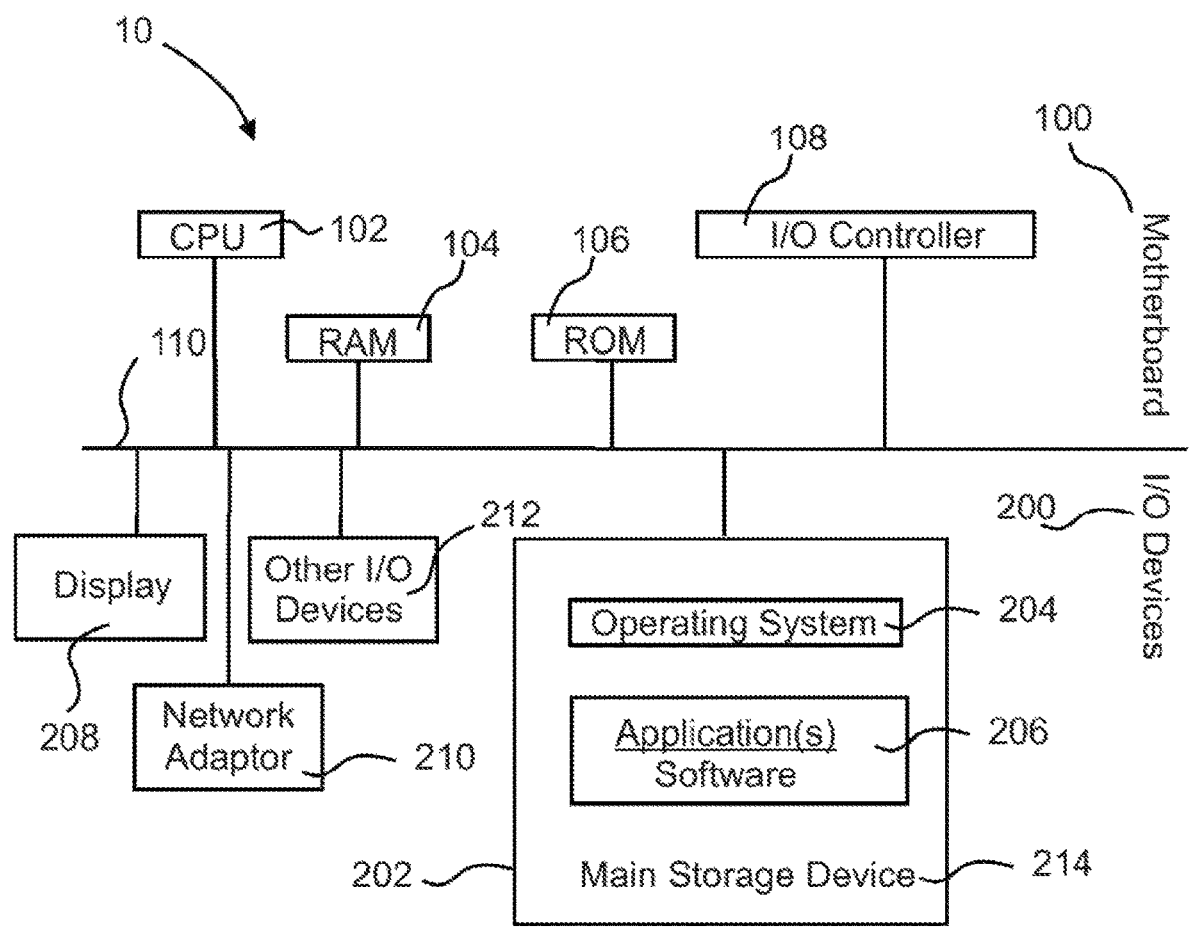
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-10, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure certain variables need to be defined.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
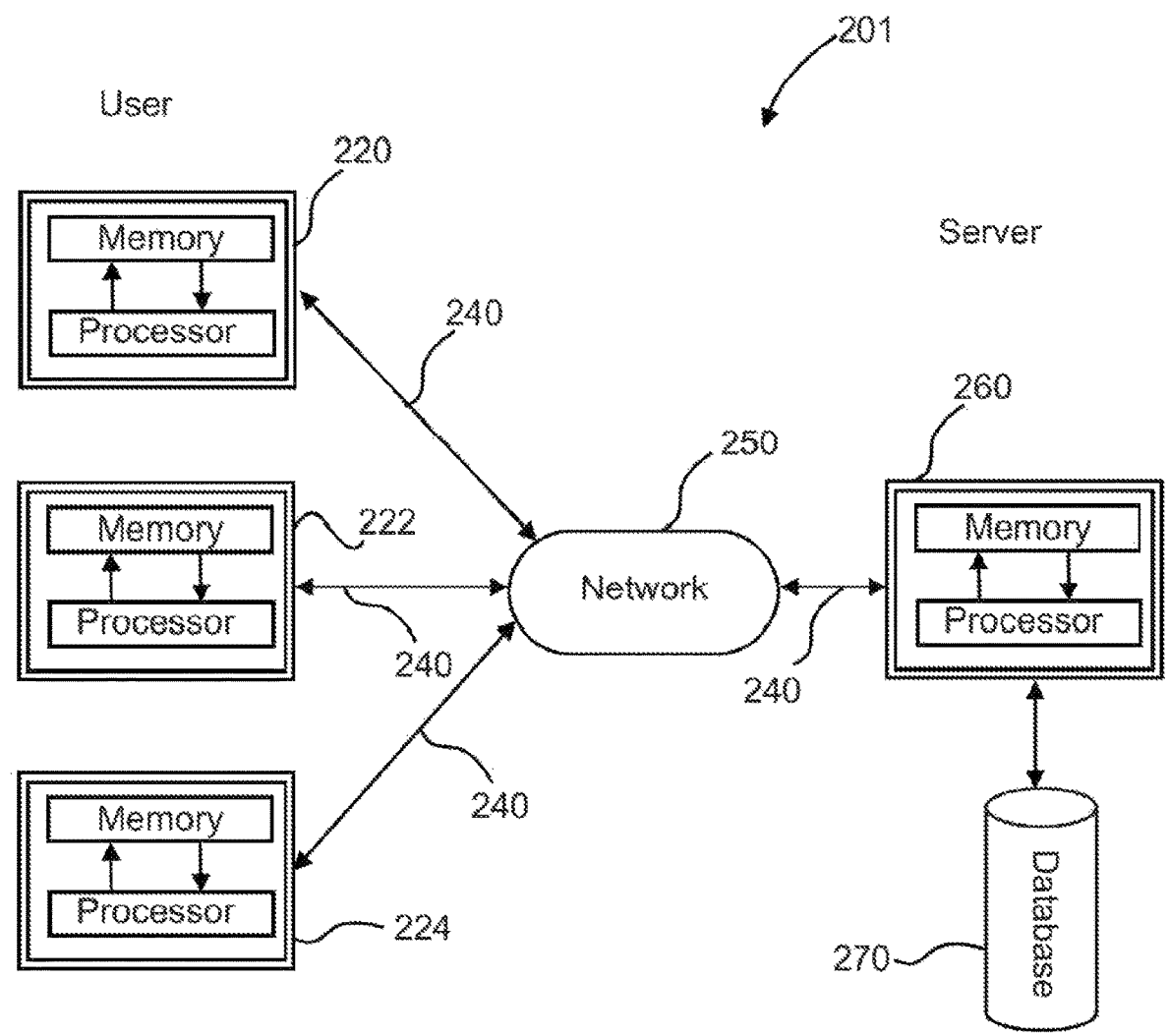
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communication system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, print and/or view multidimensional digital master image(s) 303 (see FIG. 3). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathways.

It is contemplated herein that RAM 104, main storage device 214, and database 270 may be referred to herein as storage device(s) or memory device(s).

Referring again now to FIGS. 1-10, by way of example, and not limitation, therein is illustrated various example methods of assembling data from a database 270 into various arrangements for analysis and reporting. Database 270 may be referred to as data store therein. Subscriber and customer may be used interchangeably. Although subscriber and customer information and data may be contained on database 270, the disclosure is not so limited, the disclosed method and system may be used on any large volume of data, and may contain transactional data and information pertaining to or regarding subscribers, customers, clients, and/or a plurality of individuals and/or human beings, whether living or dead, or physical or non-physical constituents of matter including, but not limited to, animals, plants, other living or non-living single or multicellular organisms, machines, artwork, digital files, objects, ingredients, inventory, components, chemical molecules, intra- or inter-stellar objects, the like, and/or combinations thereof. Furthermore, business and enterprise may be used interchangeably. Although business and enterprise and any data each may possess are used herein to describe the disclosed system and method, the disclosed system and method may be useful to many types of organizations including, but not limited to, firms, organizations, non-profits, educational institutions, governments, legislative bodies, governmental or quasi-governmental agencies, research institutes, military or quasi-military operations, advocacy organizations, nation states, international coalitions, the like, and/or combinations thereof.

Figure 3A:
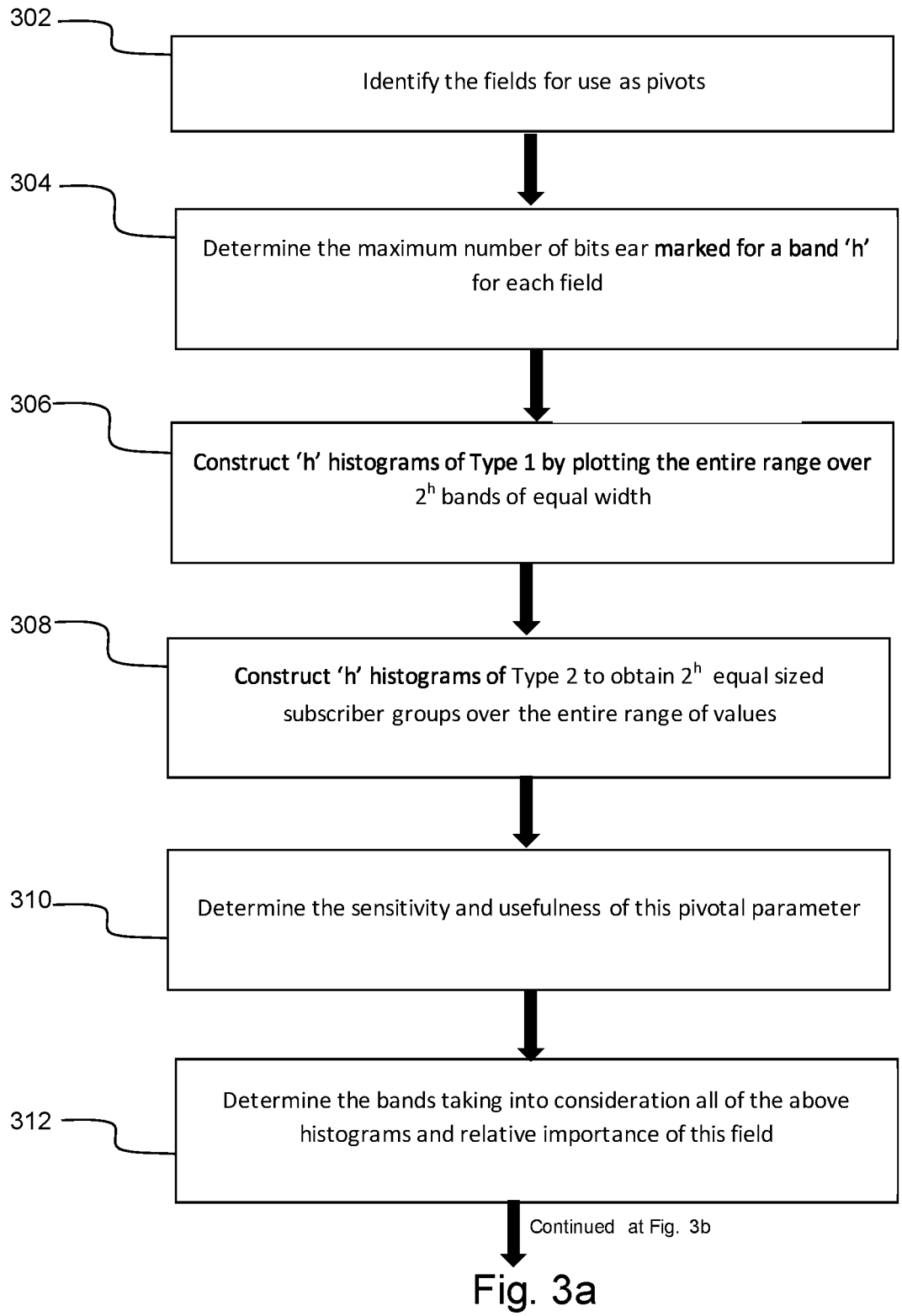
FIG. 3*a* is a flowchart showing the disclosed method steps to build bands from data contained in a data store.

Referring now to FIG. 3a, a flowchart is presented to illustrate the steps a user of the disclosed system and method would undergo after connecting to a transactional data store in determining the fields to be used to generate the first hypercube and the corresponding considerations for the output and facilitating the visualization of the data resulting from the generation of the first hypercube. At step 302, a user of the disclosed system and method would first select or identify at least one field or a plurality fields they wish to use for their first level of data organization, reporting, observation, or analysis, from a larger plurality of possible fields. Examples of these fields, by way of illustration and not limitation, could be average monthly spend, daily average data consumption, geographic location, and/or a combination of the like or any plurality of categories of information pertaining to a plurality of individuals or subscribers. Based upon the fields chosen at step 304, the maximum number of bits can be calculated for each field in regard to "h", based on the maximum values associated within the subscriber population selected and the field(s) of choice and can be thereby earmarked for a band "h" for each field. At steps 306-308, a system performing the disclosed method would construct "h" histograms for each field selected by plotting the entire range over $2^h$ bands of equal size or width over the entire range of values for each field. Based on the potential range of values in the subscriber data set in each field, at step 310, the sensitivity and usefulness of each pivotal parameter are assessed and then at step 312, the bands are constructed according to the size, range, or scope of the relevant histograms and the importance of each field, as either indicated or determined. The disclosed system and steps of the disclosed method are then further illustrated in flowcharts contained in FIGS. 3b, 3c, and 4.

Figure 3B:
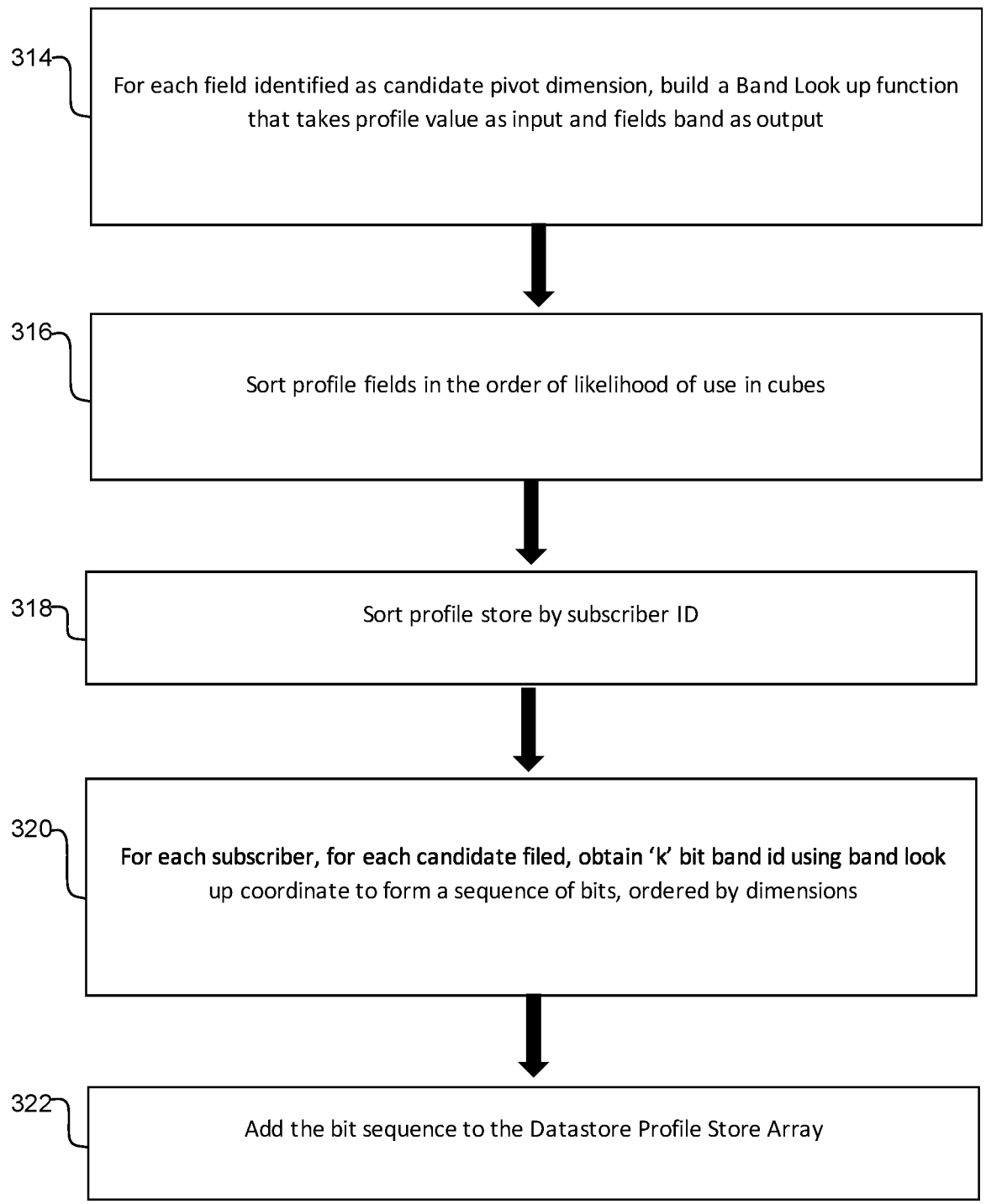
FIG. 3*b* is a flowchart showing the disclosed method steps to synthesize an initial profile store from the data store.

Referring now to FIG. 3b, a flowchart is presented to illustrate the disclosed method steps to synthesize an initial profile store from the transactional data store. At step 314, for each field identified as, but not necessarily chosen as, a candidate pivot dimension at step 302 of FIG. 3a, a Band Look-Up Function is built with profile values as inputs and field bands as outputs. Based upon either probability or user-preferences, profile fields can be sorted at step 316 into the order of likelihood of use in generating cubes. Then at step 318, a profile store may be sorted by a unique subscriber identifier for each subscriber or a unique individual identifier for each individual. This identifier may be assigned by the system or may be already assigned on the transactional data store, and may even be a number or alphanumeric identifier chosen by the subscriber itself, as in the case of a username or avatar. At step 320, for each subscriber and for each candidate field chosen by a user from among a plurality of fields of interest, a "k" bit band identifier is obtained using a band look up coordinate to form a sequence of bits, each ordered by dimensions of the cube under construction. Then at step 322, the bit sequence is added to the data store profile store array, thereby ordering the subscribers along the single-dimensional array according to each of their attribute values, given the chosen fields for use in construction of the hypercube. The result of these steps being the construction of single-dimensional arrays for each field wherein each subscriber is placed or organized according to the transactional data on the transactional data store, which constitutes an initial profile store. Subsequently, the initial profile store built from the transactional data store is synthesized into a single dimensional array representation of a hypercube by the disclosed system, according to the remaining steps illustrated in FIG. 3c.

Figure 3C:
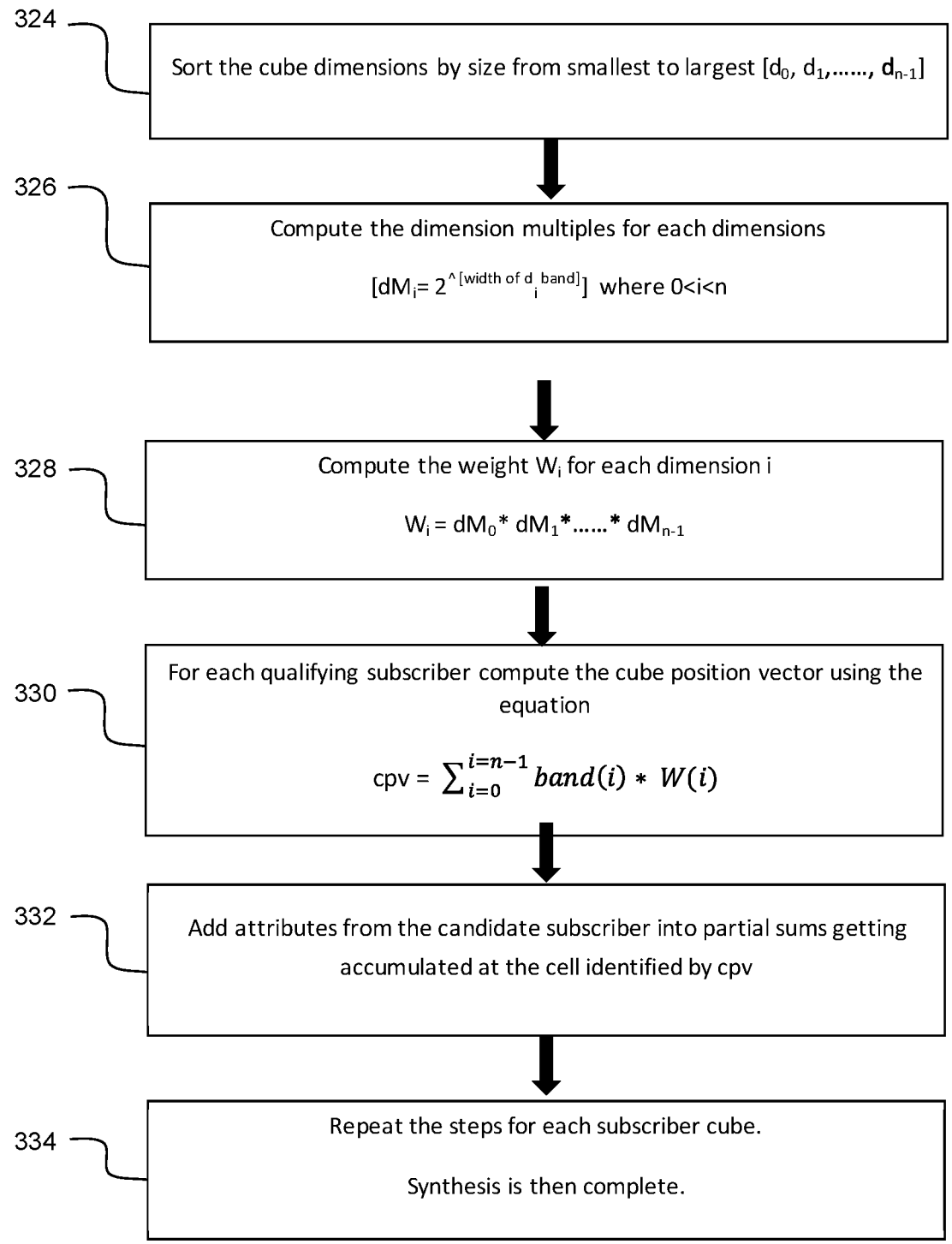
FIG. 3*c* is a flowchart showing the disclosed method steps to synthesize a flattened hypercube array.

Referring now to FIG. 3c, a flowchart is presented to illustrate the remaining disclosed method steps to synthesize a single-dimensional flattened hypercube array. First, at step 324, each single-dimensional array assembled in FIG. 3b is organized by sorting cube dimensions "0" through "n−1" ($d_0, d_1, \ldots d_{n-1}$) by size from smallest to largest. Then at steps 326-328 the dimension multiples "$dM_i$" and weight "$W_i$" for each dimension "i" are computed using the formulas: $dM_i = 2^{width\ of\ d\ band_i}$ and $W_i = dM_0 * dM_1 * \ldots * dM_{n-1}$. Then at step 330, the cube position vector "cpv" is computed for each qualifying subscriber using the equation: $cpv = \Sigma_{i=0}^{i=n-1} band(i) * W(i)$. The attributes from the candidate subscriber are then added at step 332 into partial sums as they are accumulated at the cell, or small hypercube, identified by the cube position vector. Steps 324-332 are then repeated for each subscriber cube to complete the flattened hypercube single-dimensional array at step 334. Using this first single dimensional array, the disclosed system, and the remaining steps of the disclosed method in FIG. 4, a user observing the pre-summarized data via a pivotal analysis tool may "walk" along the single-dimensional array, drilldown into the data for further observation, reporting and analysis by creating and observing data according to successive hypercubes, and "retreat" to a former position along the previous single dimensional array(s) as they are created on-demand.

Figure 4:
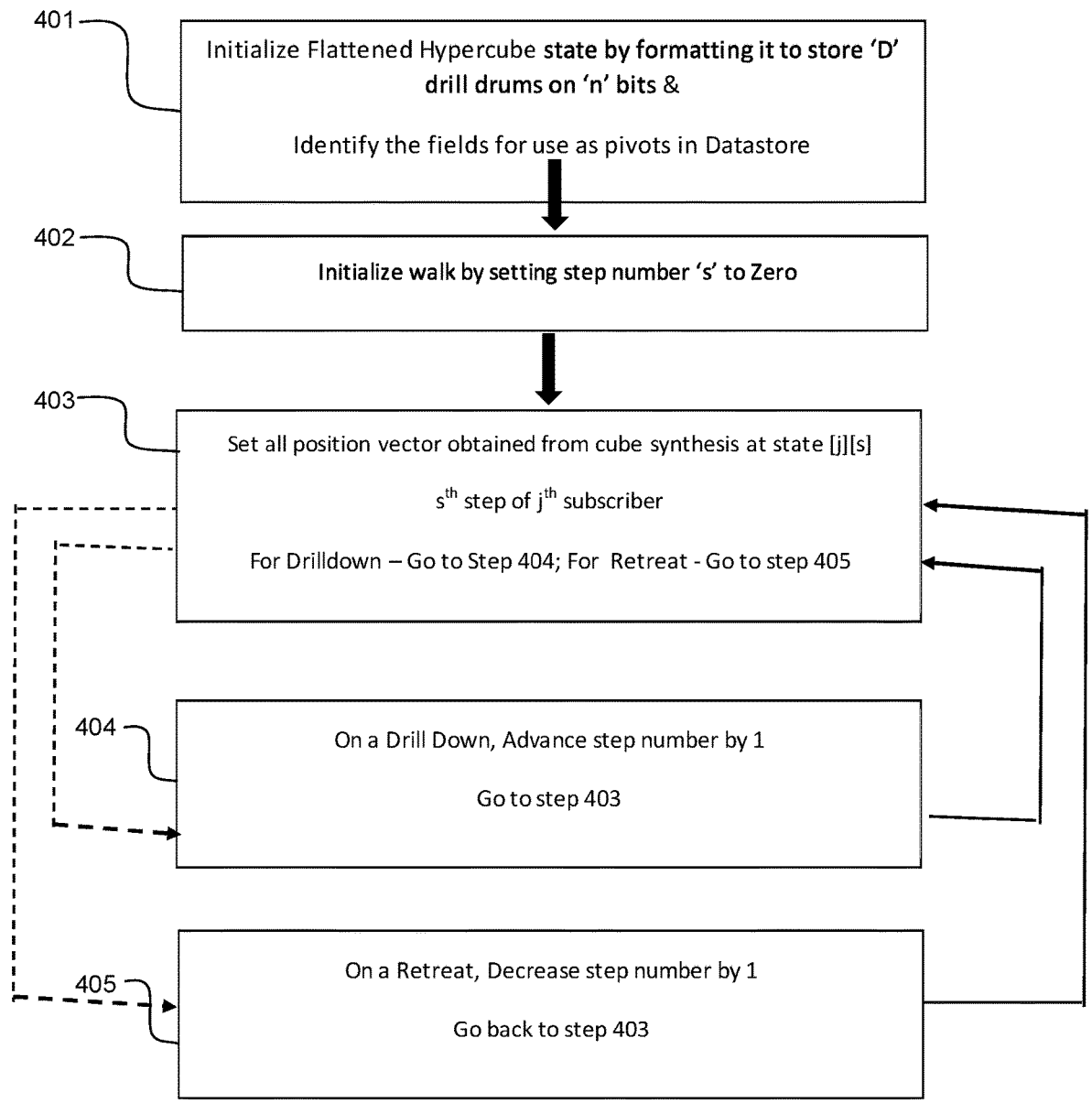
FIG. 4 is a flowchart of the disclosed method to walk, drilldown, and retreat among successive hypercubes data arrays.

Referring now to FIG. 4, a flowchart is presented to illustrate the disclosed method to walk, drilldown, and retreat among successive hypercube data arrays. Beginning at step 401, a flattened hypercube in a single dimensional array has already been completed according to the steps of 302-334 of FIGS. 3a-3c, drill drums "D" are stored on "n" bits, and further fields for use as pivots in the transactional data store via the pivotal analysis tool are identified. At step 402, the "walk" along the first or a successive single dimensional array is performed by setting step number "s" to zero (0). Then at step 403, all cube position vectors previously obtained during initial hypercube synthesis are set at state [j][s] representing $s^{th}$ step along the single dimensional array for $j^{th}$ subscriber in the array. Depending on whether a drilldown or a retreat is to be performed, the method would require proceeding to either step 404 or 405, respectively. Successive drilldown and retreats are then determined by going back to step 403. Therefore, drillingdown over multiple iterations would advance the process by repeating the step 404, advancing the step number by 1 to the desired number of iterations, thereby forming successively smaller hypercubes.

Figure 5:
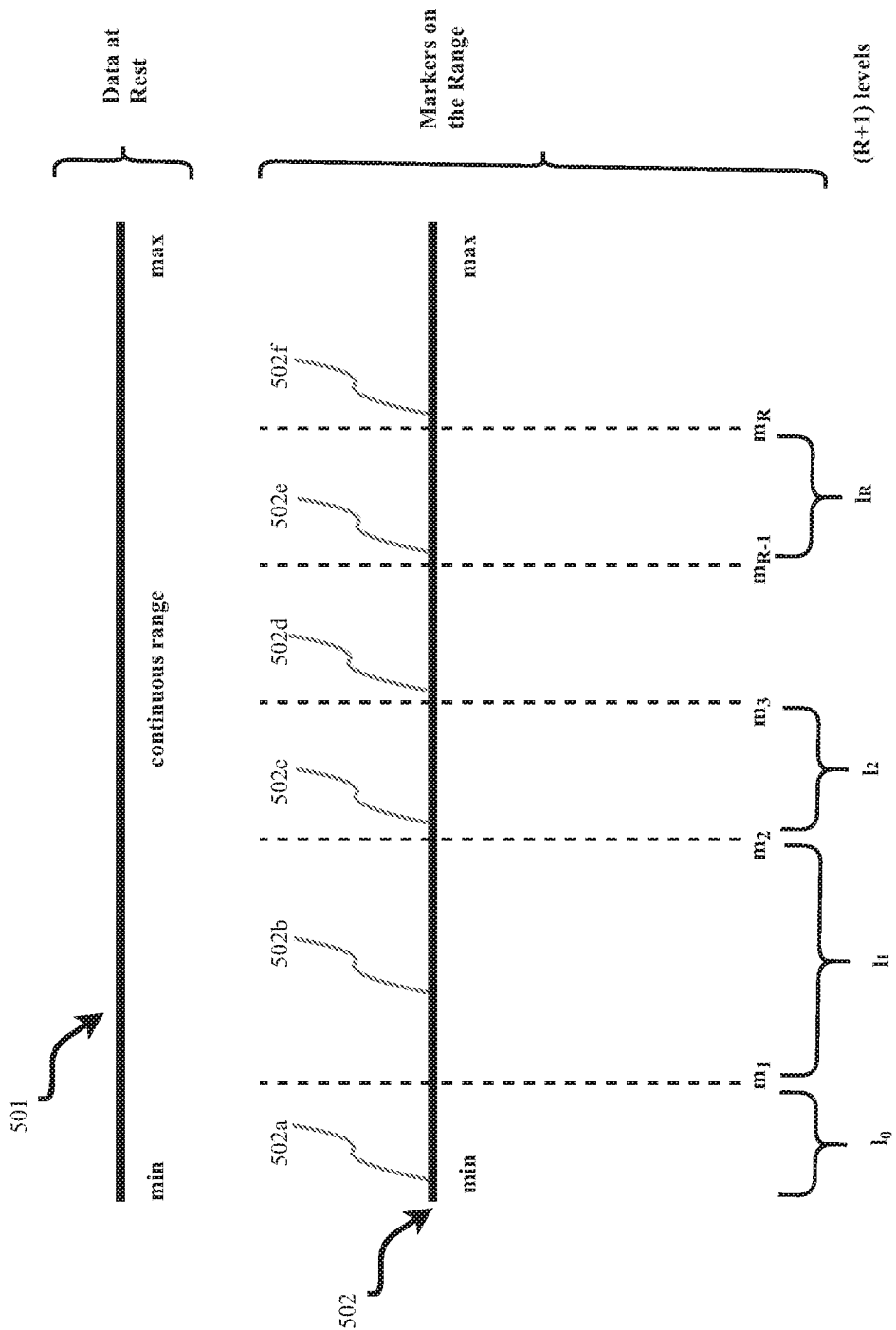
FIG. 5 is a diagram of a prior art high efficiency data arrangement.

Referring now to FIG. 5, a diagram illustrates a precursor system and method to support streamlined highly efficient data access. This system and method required data be arranged seamlessly along a continuous range 501 or a banded range 502. At rest, this data may render itself to seamless interpretation without the parsing of overheads, but it required the layout to remain intact and the moving of data to accommodate updates to ensure the range is continuous and without gaps. So for example, on banded range 502, data at rest lies along a continuous range with markers between each band. First band 502a, second band 502b, third band 502c, forth band 502d, fifth band 502e, and sixth band 502f each may possess different types or categories of data, depending on how the continuous range of data is laid out and/or arranged. Examples of these types or categories of data, by way of illustration and not limitation, could be average monthly spend, daily average data consumption, geographic location, and/or a combination of the like or any plurality of categories of information pertaining to a plurality of individuals or subscribers. If this continuous band were to be used on a transactional system, any update to the data along any point along banded range 502 would require new demarcations along banded range 502 and therefore affect the way data were stored on each successive band on the banded range 502. So while the data at rest may be easily accessed due to its arrangement, maintaining this arrangement provides obvious downsides to storing data used for transactional systems in such a manner.

Figure 6:
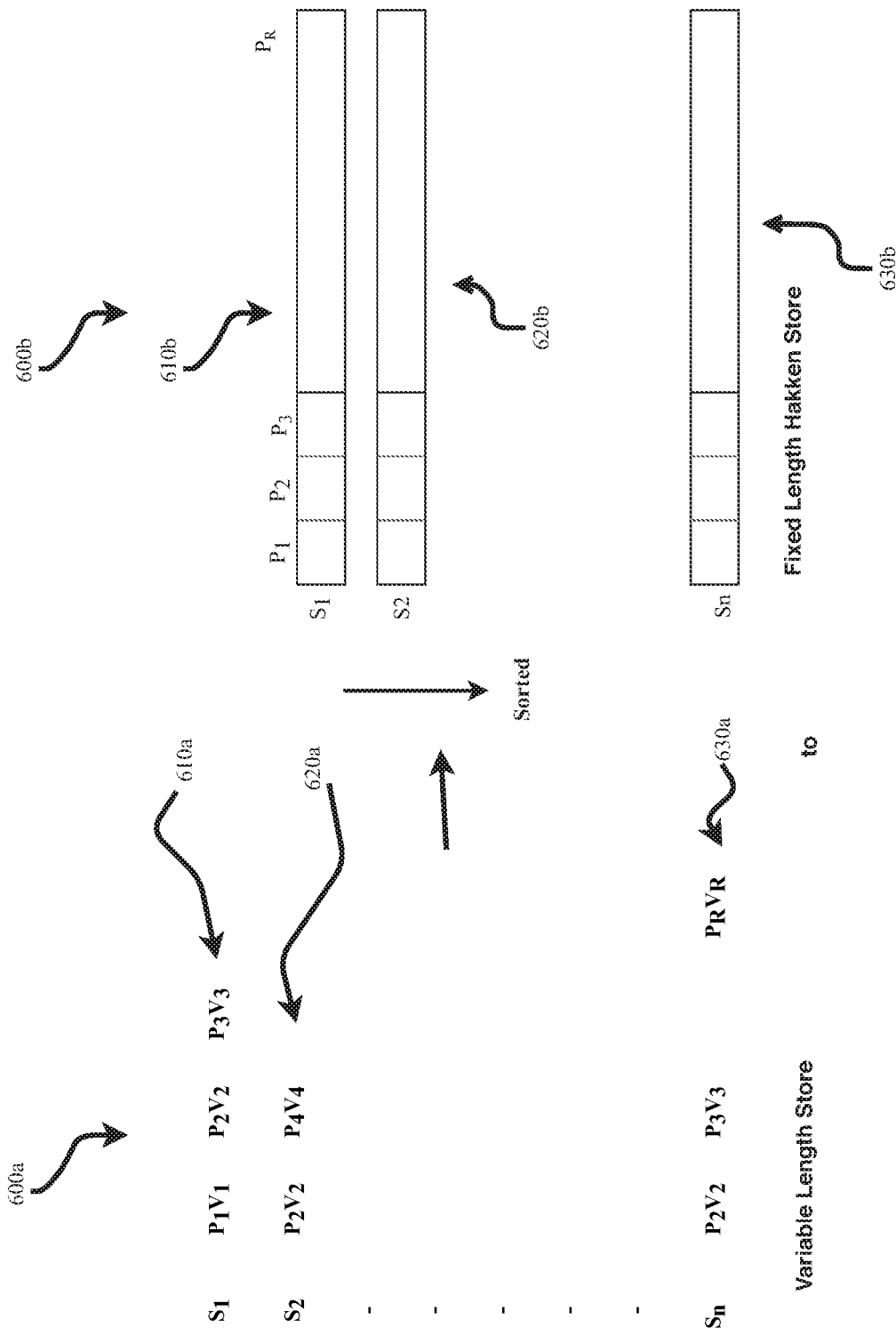
FIG. 6 is a diagram comparing a variable length data store and a fixed-length data store.

Referring now to FIG. 6, a block diagram illustrates an exemplary system and method of better adapting the principle of a continuous range store to a transactional data environment by fixing the length of a variable length subscriber store 600a into a fixed length subscriber store 600b. At a first subscriber segment 610a, a second subscriber segment 620a, and third through $n^{th}$ subscriber segments 630a, data resides in variable lengths each having a plurality of positions and vectors to represent subscriber data in each subscriber segment. While this data may be variable in length from one moment to the next in a transactional environment, one can fix this length by calculating the number of bits required for each band at a given point in time and pre-defining the number of bits to be used when constructing the subscriber segment. Then, since it is stored in a first fixed length subscriber array 610b, a second fixed length subscriber array 620b, and third through $n^{th}$ fixed length subscriber array 630b, it can be dereferenced for a key at any point without the need for an external index and may be built in a manner to facilitate a binary search along the continuous fixed length array.

Figure 7:
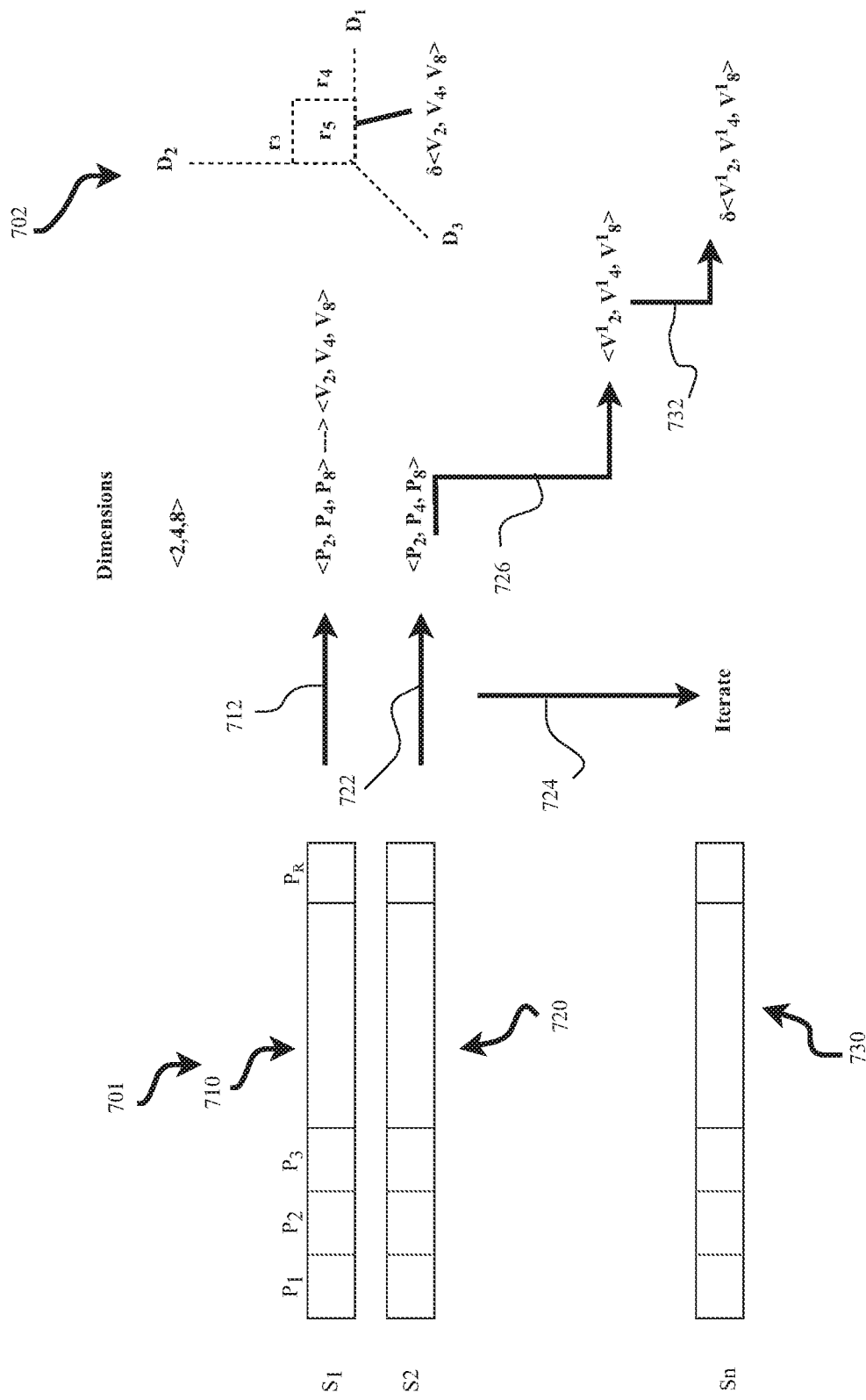
FIG. 7 is a diagram showing a data structure at each step of the disclosed method.

Referring now to FIG. 7, a block diagram illustrates an exemplary system and method of translating the fixed length subscriber store 600b of FIG. 6 onto a multi-dimensional subscriber array 702 for use in building multi-dimensional subscriber hypercubes. $S_1$ fixed length subscriber array 710, $S_2$ fixed length subscriber array, and $S_3$ through $S_n$ subscriber array may be represented as segmented bands having profile fields represented by $P_{1-R}$ having associated subscriber values of various associated widths $V_R$. In this representation, each subscriber has its own fixed length subscriber array in the fixed length subscriber store 600b, the multi-dimensional subscriber array 702 would have R dimensions in accordance with the number of profile fields in each fixed length subscriber array in the fixed length subscriber store 600b, and each axis of the multi-dimensional subscriber array 702 would represent one of such field codes. Since each profile field for each subscriber in the fixed length subscriber store 600b has its own associated width, this width can be plotted along each axis of the multi-dimensional subscriber array 702 to form a coordinate for each subscriber in the multi-dimensional subscriber array 702 once all widths along each fixed length subscriber array has been plotted along its axis associated with a field code.

Figure 8:
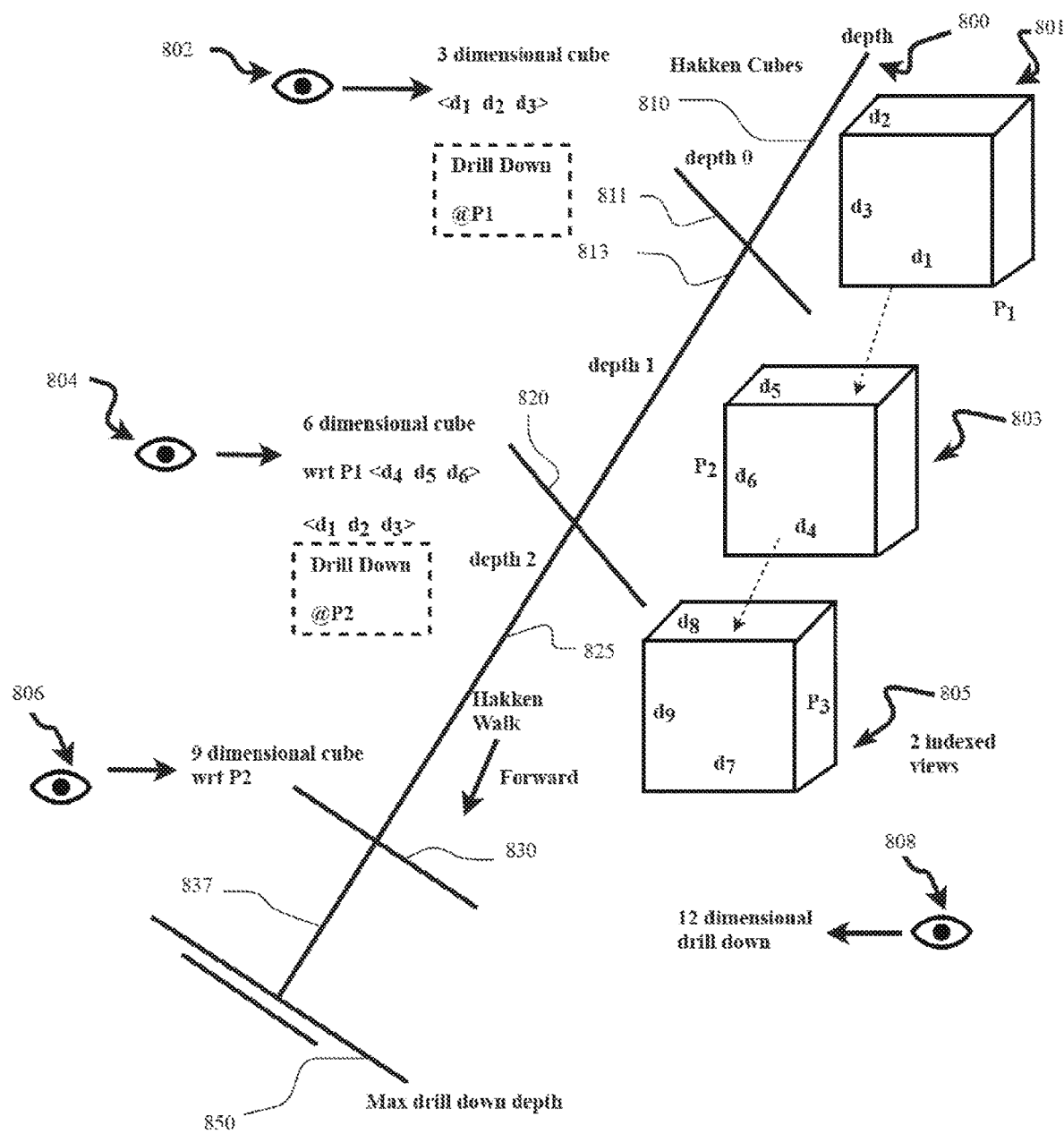
FIG. 8 is a visual representation of a user's perspective of data at successive drilldowns and hypercube syntheses.

Referring now to FIG. 8, a block diagram illustrates a view-based conceptualization of multiple cube structures combining during drilldown and retreat of an exemplary embodiment of the disclosed system and method. Each eye represents a perspective view when viewing each successive hypercube and each cube structure represents each successive multi-dimensional hypercube as they are built along the single dimensional walk array 800. First view eye 802 represents the view at the first or three-dimensional hypercube 801. Second view eye 804 represents the view at the second or six-dimensional hypercube 803 having three additional dimensions. Third view eye 806 represents the view at the third or nine-dimensional hypercube 805. Fourth view eye 808 represents the view at the fourth or twelve-dimensional hypercube (not shown). It is contemplated herein that multiple view eye and dimensional hypercubes may be utilized to pre-summarize data contained on a transactional database, each hypercube having dimensions associated with only selected fields, the data therein, and the subscribers thereby associated with the data, and doing so incrementally would result in using successively smaller hypercubes, rather than pre-summarizing all data related to all fields on a transactional database using one very large hypercube, and thereby minimizing the time required to generate the first hypercube and only processing data into hypercubes necessary to analyze what is required for a given analysis, report, or observation. Single dimensional walk array 800 contains at least a first segment 810, a second segment 813, a third segment 825, and a forth segment 837 each respectively ending at a first endpoint 811, a second endpoint 820, a third endpoint 830, and a final endpoint 850, which is used herein to represent a max drilldown depth, though a 12 dimensional drilldown merely representative of an exemplary maximum, and many more dimensions may be possible depending on the subscriber base.

Figure 9:
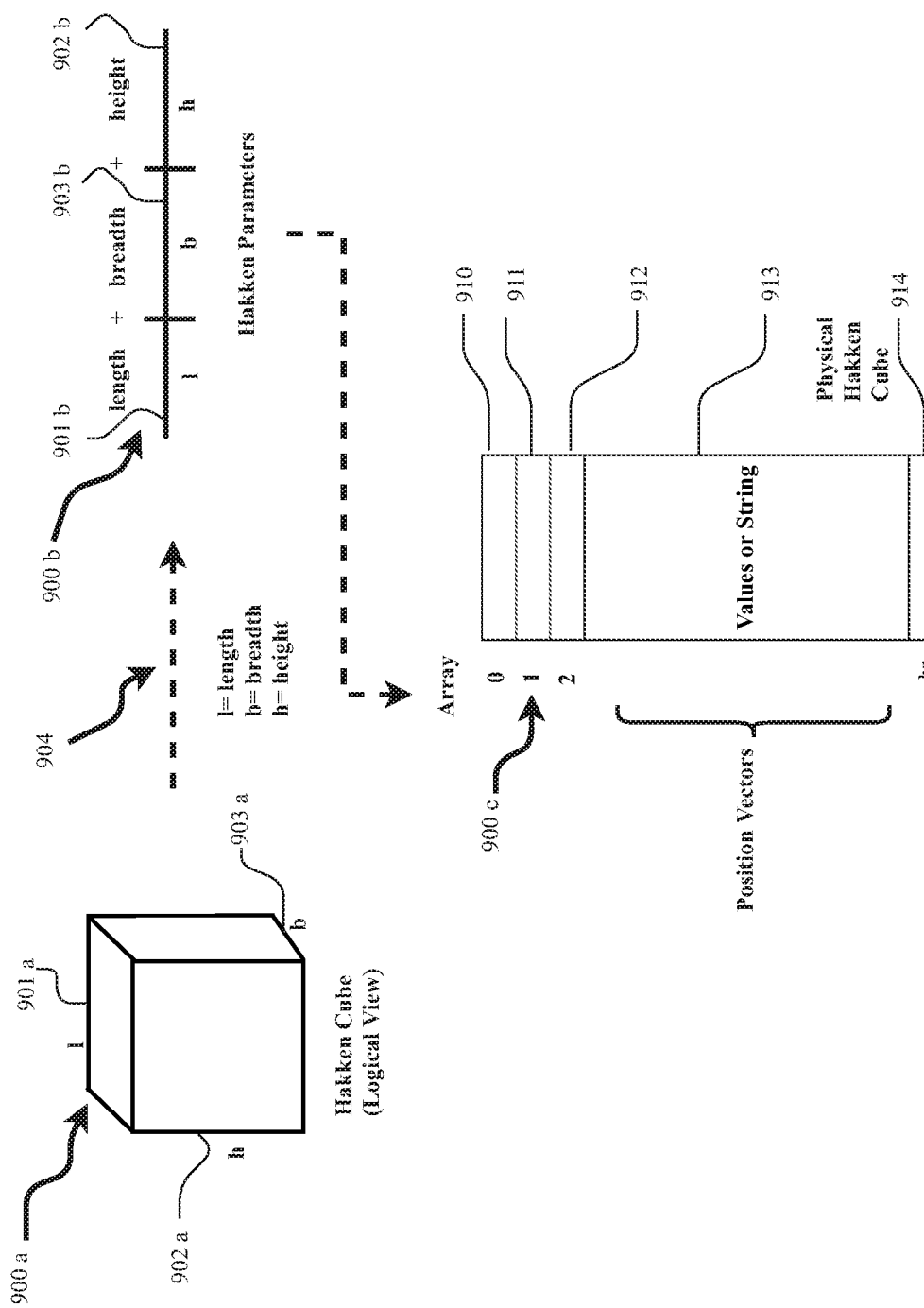
FIG. 9 is a diagram of a single first-pass hypercube array and available position vectors.

Referring now to FIG. 9, a block diagram illustrates a simple visual conceptualization of the disclosed system and method. A three-dimensional hypercube 900a is illustrated with length 901a, breadth 903a, and height 902a. When flattened at step 904 and laid out in as a flattened hypercube in a single dimensional array, its length 901b, breadth 903b, and height 902b form a continuous line 900b with a fixed length. If this three-dimensional hypercube 900 contained more than three dimensions, or n dimensions, it can be best conceptualized as a flattened array 900c having n dimensional segments of $0^{th}$ dimension 910, $1^{st}$ dimension 911, $2^{nd}$ dimension 912, $3^{rd}$ through $(n-1)^{th}$ dimensions 913, and $n^{th}$ dimension 914. By closely orchestrating the view synthesis and incrementally building successive hypercubes, flattening them, and adding them to the array, the disclosed system and method allows drilldowns and retreats from the outermost cube to the innermost cube, retaining them along the drilldown and retreat, thereby avoiding re-creating them in the case of a revisit to the same area of the multi-cube structure.

Figure 10:
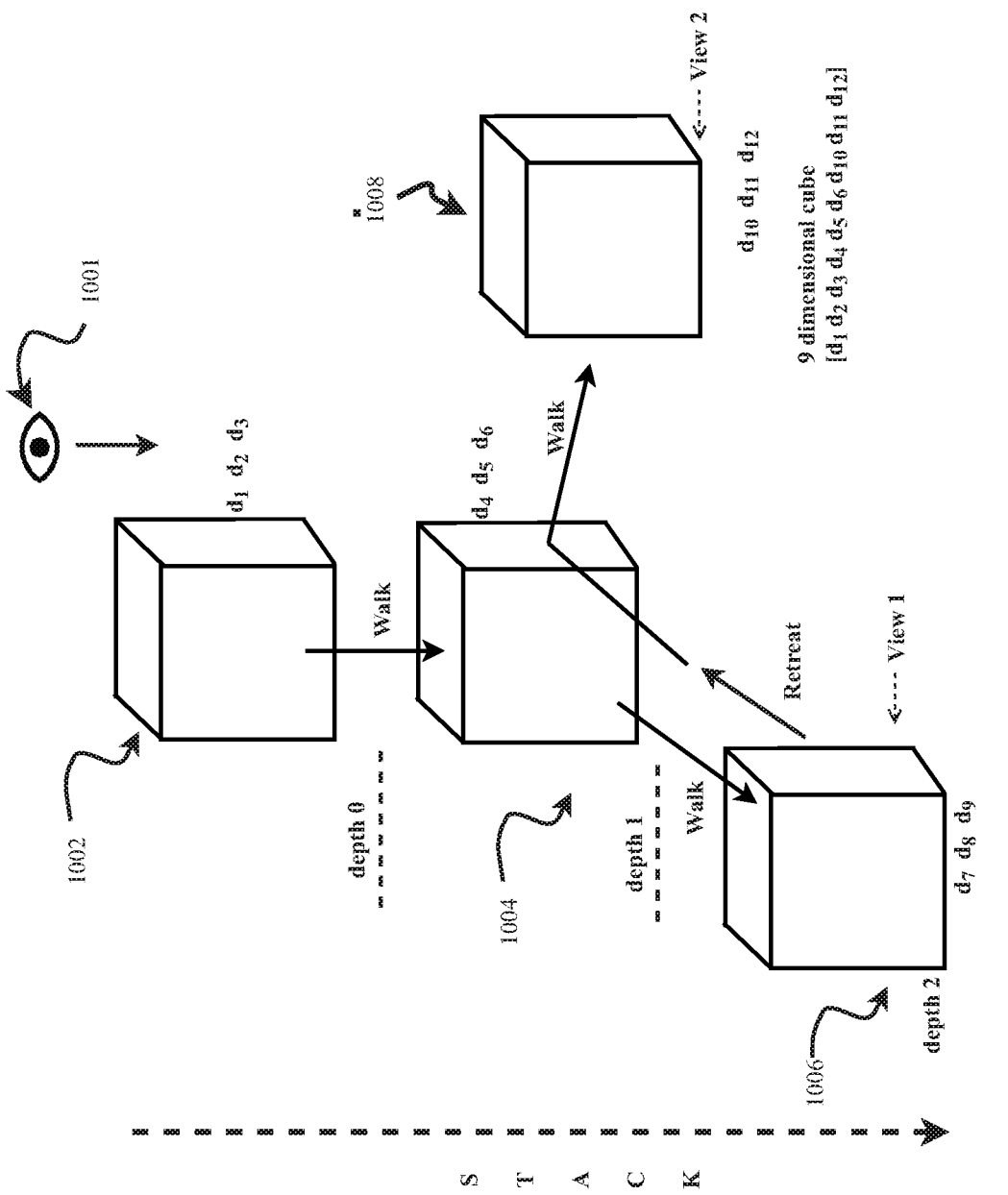
FIG. 10 is a visual representation of a stack of potential localized positions on successive hypercube arrays.

Referring now to FIG. 10, a block diagram illustrates another conceptual formulation of the disclosed system and method. Viewpoint eye 1001 is just one potential perspective by which a user of the disclosed system and method may view each of several hypercubes via a pivotal analysis tool. Once the initial hypercube 1002 having three dimensions is constructed, a user at viewpoint eye 1001 would reside at depth 0 and have access to information corresponding to initial hypercube 1002 with dimensions $d_1$, $d_2$, and $d_3$. Having access to this information and it being presented in a way that intuitively categorizes subscribers along a series of categorical ranges, each summing quantity and categorical data related to subscribers, the user may wish to choose further fields of interest via a pivotal analysis tool, which may be assigned the dimensions of a second hypercube 1004 in the stack having new dimensions $d_4$, $d_5$ and $d_6$, the viewpoint eye 1001 now residing at depth 1. Having access to this additional information and it being presented in a way that intuitively categorizes subscribers along another series of categorical ranges, each range again containing sums of subscribers and categorical data, the user may wish to choose further fields of interest, which may be assigned the dimensions of a third hypercube 1006 having dimensions $d_7$, $d_8$, and $d_9$. It is important to note that once the third hypercube 1006 has been generated, a synthetic 9-dimensional hypercube exists containing pivots, insights, vectors and information from all previously constructed dimensions of interest, without requiring the construction of an actual 9-dimensional hypercube. With this new perspective on data, new categorical ranges, and new insights that may be available at this perspective, a user may wish to export a report or a list of subscribers within a range of interest. Alternatively, a user may wish to retreat back to second hypercube 1004, a 6-dimensional hypercube. Since the third hypercube 1006 construction relied upon dimensions of the second hypercube 1004, the second hypercube 1004 remains as it was before the construction of the third hypercube 1006, and it requires no further allocation of resources to return to the previous depth 1. Now a user may wish to choose different fields for which it may assign different dimensions to build onto the second hypercube 1004. Doing so, if it were to select three additional dimensions, it would generate a forth hypercube 1008 having dimensions $d_{10}$, $d_{11}$, and $d_{12}$, and similar to the third hypercube 1006, the forth hypercube 1008 would exist as a synthetic 9-dimensional hypercube containing pivots, insights, vectors and information from the initial hypercube 1002, the second hypercube 1004, and the forth hypercube 1008, again without requiring the construction of an actual 9-dimensional hypercube. Theoretically, a user would have an infinite number of possible paths to continue gaining insights into information in its access, building up to a theoretical limit of a synthetic n-dimensional cube.

By way of example and not limitation, the disclosed system and method may be used by a telecommunications company to determine which subscriber, from among a plurality of telecommunication subscribers, to offer a service. A difficult challenge for telecommunication companies offering a wide variety of services, including but not limited to wireless voice, wireless SMS, and wireless data, to a large number of subscribers, is determining the most relevant services and segments or levels of services to market to its subscribers. The telecommunications company may have at least one transactional data store, which may house transactional data or metadata related to the plurality of telecommunication subscribers' interactions with the telecommunication service. As described above, one method to identify these customers is to generate OLAP cubes on a regular basis and use the pre-summarized tables, which result from the cube syntheses, to either analyze the data and identify the relevant subscribers or run scheduled or ad-hoc reports based on the like. By receiving a list of customers in the identified segments of interest, a telecommunications company may regularly offer its service upgrades to those subscribers identified. However, there exist shortfalls to this known method due to the requirement of sophisticated or expensive equipment and time required to generate the OLAP system as described above. Telecommunication companies may wish to have access to more up to the minute numbers or alternatively may wish to deploy such a system on less expensive or sophisticated equipment.

With these desires in mind, in a hypothetical example of an exemplary report generated using the disclosed system and method for use of a subscriber population for a telecommunications company, the company may first connect its transactional system with a data store to the disclosed system capable of performing the disclosed method. Having so connected the disclosed system to a transactional data store, it could request a data from a plurality of categories of subscriber information from the data set and receive the corresponding data from the transactional data store. Then, based on a user input, the disclosed system could build a first multi-dimensional hypercube from the data, having dimensions corresponding to the plurality of categories of subscriber information, flatten the first multi-dimensional hypercube into a banded single-dimensional array, identify a set of fields for use as pivots in a pivotal analysis tool along the single-dimensional array, and build at least one successive multi-dimensional hypercube. This successive multi-dimensional hypercube would have dimensions corresponding to the set of fields for use as pivots and each successive multi-dimensional hypercube would contain an incrementally smaller subset of data.

Having incorporated the disclosed system into its system, an exemplary system being configured for display of information via a graphical user interface, for analyzing its subscriber population and having performed the proposed method of generating the first multi-dimensional hypercube and flattening it into a banded single-dimensional array, it could then perform an example analysis. Wishing to determine whom among its subscribers would be the most lucrative to market additional voice and data services, it may first categorize dimensions for analysis for its first multi-dimensional hypercube for subscribers who spent more than $0.00 in the last month and have a smart phone based on the number of qualifying subscribers, their average age-in-network, and their average revenue per month. When viewing the data in a summarized format, a typical graphical user interface may show in a resulting table or pivotal analysis tool based on the information in the cube, the following: the total qualifying subscribers, their average age-in-network, and their average total revenue per month. It may also rank or sort fields for use in the order from most likely to least likely to be used based on a variety of factors including, by way of example and not limitation, user-defined preferences, popularity of use among any cross-section of users, programmer defined sorting or ranking, and/or some combination of the like. Satisfied with this summary, a user wishing to further explore the data associated with this subscriber population may drilldown further into age-in-network and average revenue per unit while requesting summarization based on total revenue per identified category, each becoming a further dimension upon drilldown. The disclosed system would again request these categories of information and build a successive hypercube and then may return a pivot table with a plurality of columns showing banded categories for average revenue per unit and a plurality of rows showing banded categories for average age-in-network. Depending on the character of the subscriber population, this pivot table may reveal that a telecommunications company's subscribers having over three years in network would represent the highest total average revenue per unit. Now knowing this information about a group or grouping of individual types or subscriber types, it may wish to select the rows representing more than three years in network for further analysis, as it represents its most profitable subscriber category. Selecting these rows for further drilldown, it could then add the dimensions of voice spend over the past 30 days and data spend over the last 30 days. The disclosed system would then perform the disclosed method to build another, now smaller, hypercube using the dimensions of voice and data spend over the last 30 days. After having generated this hypercube during this drilldown, another pivot table could be generated, this time with columns of banded categories for data spend and rows for voice spend. The plurality of cells would each represent a subscriber population which may be the most profitable subscribers, divided into categories based upon their consumption of voice and data. Subscriber sub-populations in cells with low voice spend and high data spend may be offered additional voice services and subscriber sub-populations in cells with low data spend and high voice spend may be offered additional data services. The cells of interest, which would represent a grouping of individuals or subscribers, could then be exported as a list of individuals or subscribers for later targeted marketing. These cells or groupings of cells, by virtue of being a grouping of individuals or subscribers sharing similar characteristics, may refer to an individual type, a group of individual types, or a grouping of individuals sharing a common behavior or usage pattern.

In select embodiments, additional fields and data may be of interest. For telecommunications companies, by way of example and not limitation, these fields and/or data may include streaming video consumption, streaming audio consumption, internet-based gaming activity, social media activity measured in data or time, web browsing behavior, international calling behavior, international roaming behavior, and/or combinations of the like. One skilled in the art would understand that due to increasing constraints that may be placed on a system deploying the disclosed system and method, it may be preferable to limit the number of successive hypercubes once a user reaches or achieves a maximum number of successive hypercubes or finite number of possibilities so as to improve system performance.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A method for facilitating an interactive on-demand hypercube synthesis based multi-dimensional drilldown and pivotal analysis tool, the method comprising the steps of:
    accessing an at least one data set on a transactional data store, said at least one data set containing information pertaining to a plurality of individuals, said individuals each corresponding to a unique individual identifier;
    requesting a data from a plurality of categories of information from said at least one data set stored on said transactional data store;
    building a first multi-dimensional hypercube from said data, having dimensions corresponding to said plurality of categories of information;
    flattening said first multi-dimensional hypercube into a banded single-dimensional array;
    identifying a set of fields for use as pivots along said banded single-dimensional array; and
    building at least one successive multi-dimensional hypercube, said at least one successive multi-dimensional hypercube having dimensions corresponding to said set of fields for use as pivots;
    wherein each of said at least one successive multi-dimensional hypercube contains an incrementally smaller subset of data.

2. The method of claim 1, wherein the method is performed by a user via a graphical user interface at a computer having a display.

3. The method of claim 2, wherein said graphical user interface mimics a pivotal analysis tool having access to a pre-summarized OLAP cube system by generating said first and said at least one successive multi-dimensional hypercubes for a plurality of fields of interest based upon a user input.

4. The method of claim 3, wherein said graphical user interface contains a plurality of rows and columns and a plurality of cells among said plurality of rows and columns.

5. The method of claim 4, wherein each of said plurality of rows and columns represents at least one dimension of a hypercube built by said method and each of said plurality of cells represents a grouping of individuals corresponding to each of said plurality of rows and columns.

6. The method of claim 5, wherein at least one of said plurality of cells may be selected via said graphical user interface, thereby generating a list of individuals represented by said cell.

7. The method of claim 1, wherein said individuals comprise an at least one individual type from a group of individual types comprising subscribers, customers, clients, and users.

8. The method of claim 7, wherein said transactional data store contains a plurality of information regarding a plurality of telecommunication subscribers and said plurality of telecommunication subscribers' interactions with a telecommunication company.

9. The method of claim 1, wherein a maximum number of successive hypercubes is set to a finite number.

10. The method of claim 1, further comprising the step of flattening said at least one successive multi-dimensional hypercube into a second banded single-dimensional array.

11. The method of claim 10, further comprising the step of identifying a second set of fields for use as pivots along said second banded single-dimensional array.

12. The method of claim 11, further comprising the steps of selecting a subset of fields from among the second set of fields for use as pivots along said second banded single-dimensional array and building a second successive multi-dimensional hypercube, said second successive multi-dimensional hypercube having a plurality of dimensions corresponding to said subset of fields selected.

13. The method of claim 1, further comprising the steps of ranking said set of fields for use as pivots in an order of likelihood of use by an end user and sorting said set of fields for use as pivots along said banded single-dimensional array in an order of likelihood of use from most likely to least likely.

14. A system comprising an apparatus having at least one processor and at least one memory including computer program code having a means to access at least one transactional data store, the at least one memory and the computer program code configured to, with the at least one processor, cause the system to:
    accessing said transactional data store, said transactional data store comprising an at least one data set, said at least one data set containing information pertaining to a plurality of individuals, each of said plurality of individuals corresponding to a unique individual identifier;

request a data from a first plurality of categories of information from said at least one data set stored on said transactional data store;

build a first multi-dimensional hypercube from said data, having a plurality of dimensions corresponding to said plurality of categories of information;

flatten said first multi-dimensional hypercube into a banded single-dimensional array;

identify a set of fields for use as pivots along said single-dimensional array; and build at least one successive multi-dimensional hypercube by requesting and receiving a second plurality of categories of information from said at least one data set stored on said transactional data store, said at least one successive multi-dimensional hypercube having dimensions corresponding to said set of fields for use as pivots;

wherein each of said at least one successive multi-dimensional hypercube contains an incrementally smaller subset of data.

15. The system of claim 14, further comprising a graphical user interface.

16. The system of claim 15, wherein said graphical user interface mimics a pivotal analysis tool having access to a pre-summarized OLAP cube system by generating said first and said at least one successive multi-dimensional hypercubes for a plurality of fields of interest based upon a user input.

17. The system of claim 16, wherein said graphical user interface contains a plurality of rows and columns and a plurality of cells among said plurality of rows and columns.

18. The system of claim 17, wherein each of said plurality of rows and columns represents at least one dimension of a hypercube and each of said plurality of cells represents a grouping of individuals corresponding to each of said plurality of rows and columns.

19. The system of claim 18, wherein at least one of said plurality of cells may be selected via said graphical user interface, thereby generating a list of individuals represented by said cell.

20. A method for facilitating an interactive on-demand hypercube synthesis based multi-dimensional drilldown and pivotal analysis tool, the method comprising the steps of:

connecting to a transactional data store, said transactional data store comprising an at least one data set, said at least one data set containing information pertaining to a plurality of individuals, said individuals each corresponding to a unique individual identifier;

requesting a data from a plurality of categories of information from said at least one data set stored on said transactional data store;

transmitting said data from said transactional data store and receiving said data;

building a first multi-dimensional hypercube from said data, having dimensions corresponding to said plurality of categories of information;

flattening said first multi-dimensional hypercube into a banded single-dimensional array;

identifying a set of fields for use as pivots along said banded single-dimensional array; and building at least one successive multi-dimensional hypercube, said at least one successive multi-dimensional hypercube having dimensions corresponding to said set of fields for use as pivots;

wherein each of said at least one successive multi-dimensional hypercube contains an incrementally smaller subset of data.

* * * * *